United States Patent

Anchor et al.

[11] Patent Number: 5,860,586
[45] Date of Patent: Jan. 19, 1999

[54] RETAINABLE ACCESS TAB FOR A FLOWABLE MATERIAL CONTAINER

[75] Inventors: David Anchor, Itasca, Ill.; Tommy Bo Göran Ljungström, Hoor, Switzerland

[73] Assignee: Tetra Laval Holdings & Finance, S.A., Pully, Switzerland

[21] Appl. No.: 769,018

[22] Filed: Dec. 18, 1996

[51] Int. Cl.$^6$ .................................. B65D 5/70; B65D 5/72
[52] U.S. Cl. ..................... 229/103.1; 229/208; 229/213
[58] Field of Search ................. 229/103.1, 208, 229/213, 229; 220/705; 222/541.5, 541.6

[56] References Cited

U.S. PATENT DOCUMENTS

| | | |
|---|---|---|
| 3,613,986 | 10/1971 | Christensson ........................... 229/208 |
| 3,770,185 | 11/1973 | Reeves . |
| 4,244,474 | 1/1981 | Wise . |
| 4,591,091 | 5/1986 | Wise . |
| 4,798,295 | 1/1989 | Rausing ................................... 229/229 |
| 4,858,766 | 8/1989 | Tsai . |
| 5,201,459 | 4/1993 | Bettle, Jr. et al. . |
| 5,474,232 | 12/1995 | Ljungstrom et al. ................... 229/137 |

*Primary Examiner*—Gary E. Elkins
*Attorney, Agent, or Firm*—Michael A. Catania

[57] ABSTRACT

A retainable access tab for a laminate for a carton blank is disclosed. The retainable access tab may have a predetermined configuration such as keyhole configuration or a hourglass configuration. The retainable access tab extends the length of a roof panel of a carton which is formed from the carton blank. In this manner, a shortened straw may be utilized to access the entire contents of the carton. The retainable access tab provides a hygienic environment for accessing the contents of the carton by revealing a previously untarnished surface for penetration of the straw. The retainable access tab has a hinge which allows it to be retained to the carton after insertion of a straw, In this manner, the potential for littering is decreased and the potential for greater recycling is increased by the present invention.

8 Claims, 4 Drawing Sheets

RETAINABLE ACCESS TAB FOR A FLOWABLE MATERIAL CONTAINER

BACKGROUND OF THE INVENTION

1. Field of the Invention

The present invention generally relates to openings for access to containers for flowable materials. Specifically, the present invention relates to a retainable tab for providing access to a container for flowable material through use of a straw.

2. Description of the Related Art

In designing beverage containers for the general consuming public, there are two major design factors: (1) providing easy access to the contents of the container; and (2) maintaining the integrity of the container during transport from the form, fill and seal machine to the retail outlet. As is obvious to those skilled in the pertinent art, these two major factors are at odds with each other which creates problems for those designing beverage containers.

Reflecting on the not too distant past, consumers had to either tear open the top of the container or cut the container with scissors or another cutting instrument to access the contents. Progress led to containers designed with weakened portions or portions with minimal material which provide for access to the contents of the container using a straw. An example of such a patent is Wise, U.S. Pat. No. 4,591,091 for a Aseptic Container With Tamper-Resistant Spout And Blank Therefor. It is obvious that such containers with weakened portions allow for easy access to the contents, however, the integrity of the container is sacrificed for this easy access.

The introduction of new materials for containers has enabled the containers to maintain integrity with the use of less material. This has provided opportunities for new designs to access the contents of the container. An example is Bettle, Jr. et al, U.S. Pat. No. 5,201,459, for a Beverage Container With Novel Dispensing Means. The foregoing patents, although efficacious in providing access to the contents of a container, are not the denouement of the problems of accessing the contents of containers. There are still unresolved problems which compel the enlargement of inventions in the field of accessing the contents of containers.

BRIEF SUMMARY OF THE INVENTION

The novel retainable access tab of the present invention furthers the packaging industries solutions to the problems of accessing the contents of a container. The novel retainable access tab has an unique structure which although seemingly simple, involves a plethora of design parameters which provides for facilitated access to the contents of a container.

One aspect of the present invention is a retainable access tab for a laminate for a flowable material container. The flowable material is withdrawn from the container with a drawing tube which accesses the contents of the container through the retainable access tab. The laminate is composed of a paperboard material coated on an interior surface and an exterior surface with a thermoplastic barrier material. The retainable access tab comprises a predetermined configuration incised from the laminate. The retainable access tab having a hinge and extending along substantially the length of a roof panel thereby allowing for the utilization of the drawing tube having a length substantially equal to the length of one of a plurality of side panels of the container. The retainable access tab reveals the core paperboard layer for facilitated penetration by the drawing tube.

The predetermined configuration of the retainable access tab may be a keyhole shape. The predetermined configuration of the retainable access tab may be a hour-glass shape. The hinge may be located at the top of retainable access tab. The flowable material may be a liquid food product such as milk or juice. The retainable access tab may terminate at a transverse score line of the container which forms the lower boundary of one of the roof panels. The transverse score line may be curved.

Another aspect of the present invention is a carton blank designed for folding into a gable top carton and subsequent filling with a flowable material contents which is withdrawn from the gable top carton by a drawing tube. The carton blank has a plurality of longitudinal score lines dividing the carton blank into a plurality of side panels. The carton also has a plurality of transverse score lines dividing the carton blank into a plurality of roof panels and a plurality of bottom panels. The carton blank is composed of a paperboard material coated on an interior surface and an exterior surface with a thermoplastic barrier material. The improvement to the carton blank comprises a retainable access tab located on one of the plurality of roof panels. The retainable access tab has a hinge and extends along substantially the length of the roof panel thereby allowing for the utilization of the drawing tube having a length substantially equal to the length of one of the plurality of side panels. The retainable access tab reveals the core paperboard layer for facilitated penetration by the drawing tube.

The retainable access tab for the carton blank may have a keyhole configuration. Alternatively, the retainable access tab for the carton blank may have a hour glass configuration. At least one of the plurality of transverse score lines of the carton blank may be curved. The hinge may be located at the top of retainable access tab. The retainable access tab may terminate at a transverse score line which forms the lower boundary of one of the roof panels of the carton blank. Alternatively, the retainable access tab may terminate beyond a transverse score line. The flowable material may be a liquid food product such as juice or milk. The carton blank may be incised solely from the exterior surface thereby maintaining the integrity of the interior surface and its barrier properties.

Another aspect of the present invention is a retainable access tab for an aseptically packaged carton having a roof panel. The carton is composed of a paperboard material coated on an interior surface and an exterior surface with a thermoplastic barrier material. The carton undergoes aseptic processing prior to filling with a flowable material which is withdrawn from the carton with a drawing tube. The retainable access tab comprises a predetermined configuration incised into the roof panel. The retainable access tab has a hinge and extends along substantially the length of the roof panel thereby allowing for the utilization of the drawing tube having a length substantially equal to the length of one of a plurality of side panels of the carton. The retainable access tab reveals the core paperboard layer for facilitated penetration by the drawing tube.

The predetermined configuration of the retainable access tab of the aseptically packaged carton may be a keyhole shape. Alternatively, the predetermined configuration of the retainable access tab of the aseptically packaged carton may be a hour-glass shape. At least one of a plurality of transverse score lines of the aseptically packaged carton may be curved. The hinge may be located at the top of the retainable access tab.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which:

There is illustrated in FIG. 1 a plan view of a carton blank with one embodiment of the retainable access tab of the present invention.

Figure 2:
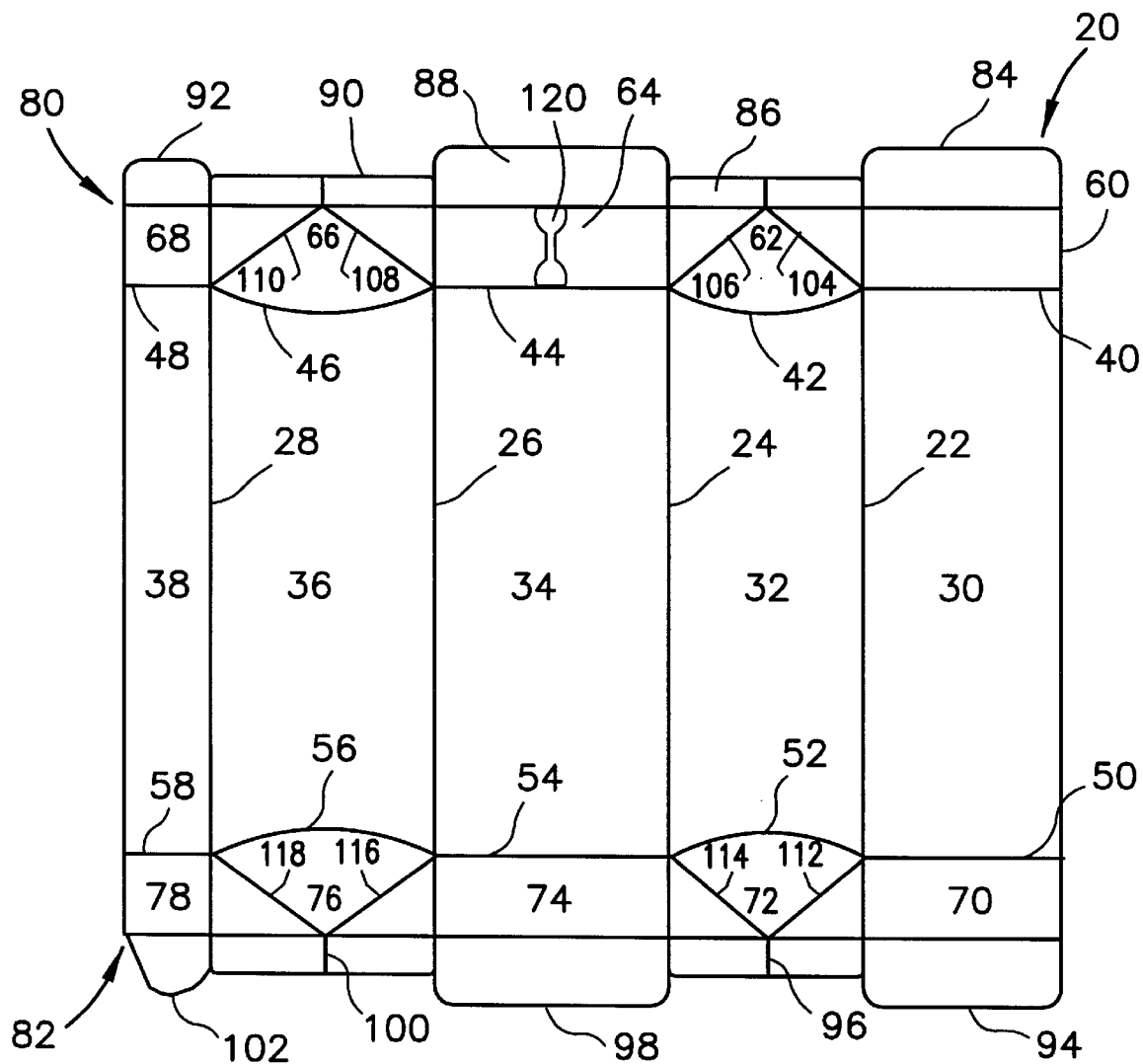

There is illustrated in FIG. 2 a plan view of a carton blank with an alternative embodiment of the retainable access tab of the present invention.

Figure 3:
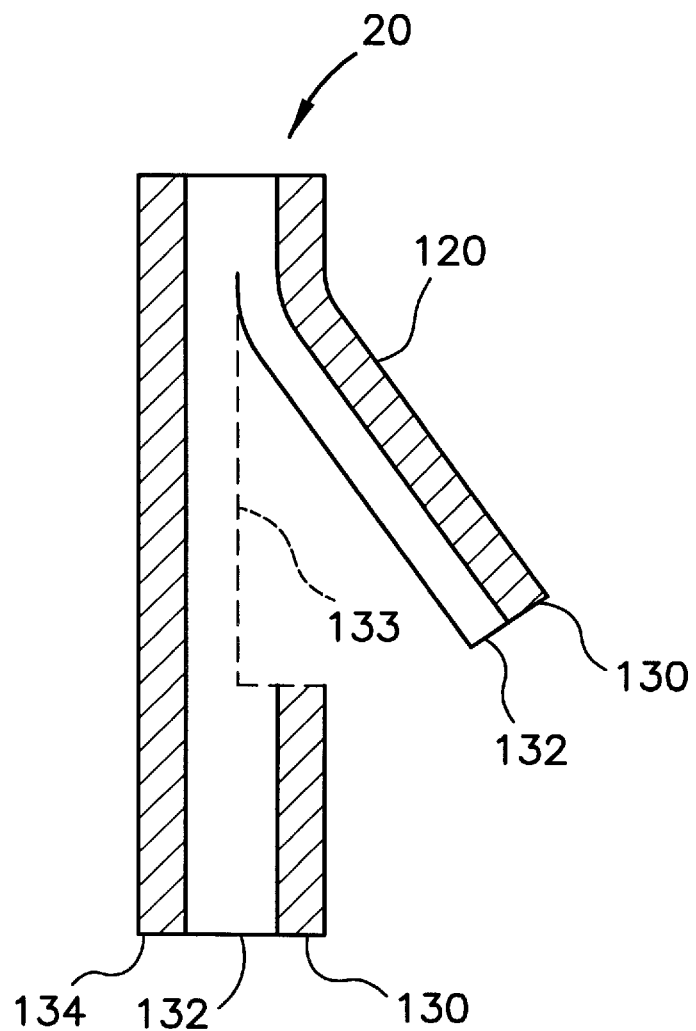

There is illustrated in FIG. 3 a partial sectional view of the carton blank of the present invention.

Figure 4:
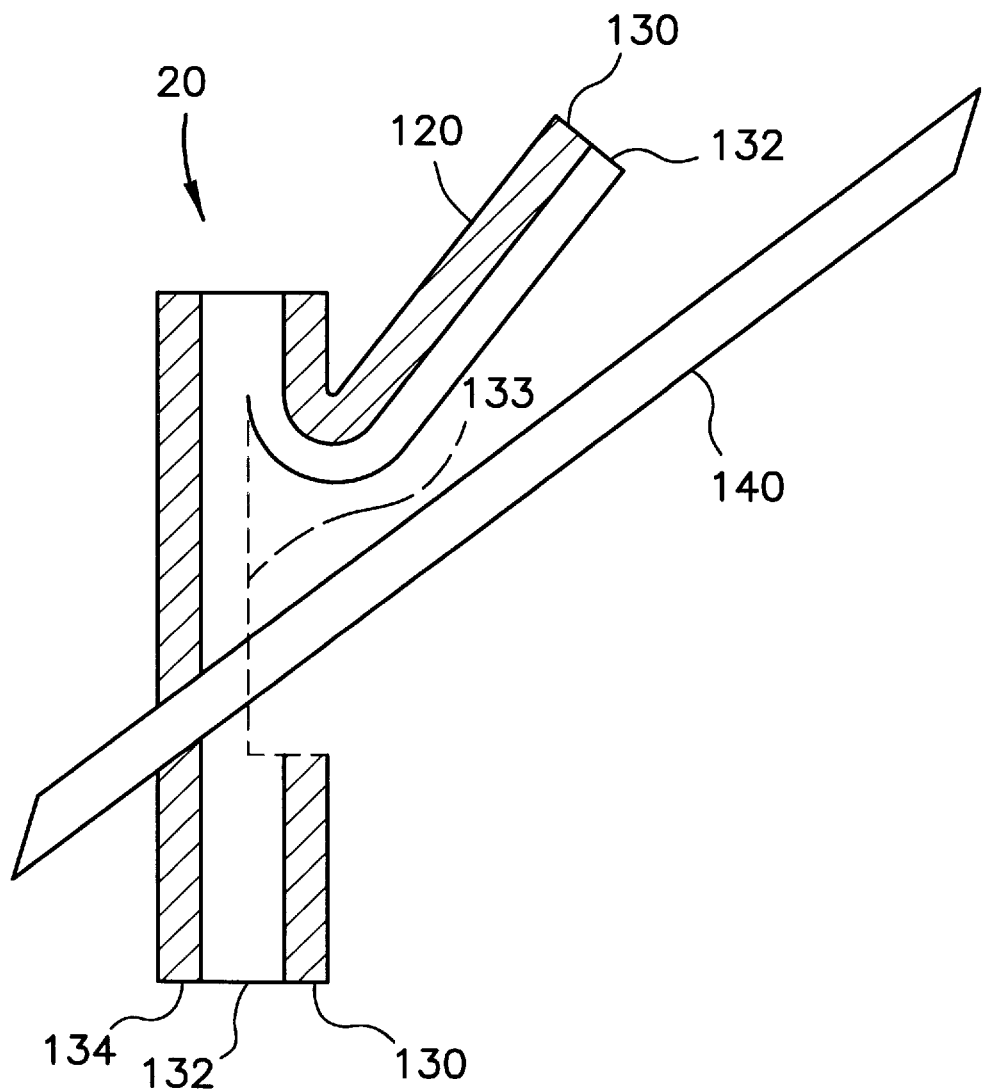

There is illustrated in FIG. 4 a partial sectional view of the carton blank of the present invention with a straw inserted therethrough.

DETAILED DESCRIPTION OF THE INVENTION

The present invention allows for the facilitated accessibility to the contents of a carton while maintaining the integrity and barrier properties of the carton prior to consumption. The retainable access tab of the present invention may also provide for minimal closure of the carton after the initial penetration of the carton by a straw. The retainable access tab of the present invention also diminishes the proliferation of trash and enhances the recycleability of all of the parts of the carton including the retainable access tab.

Figure 1:
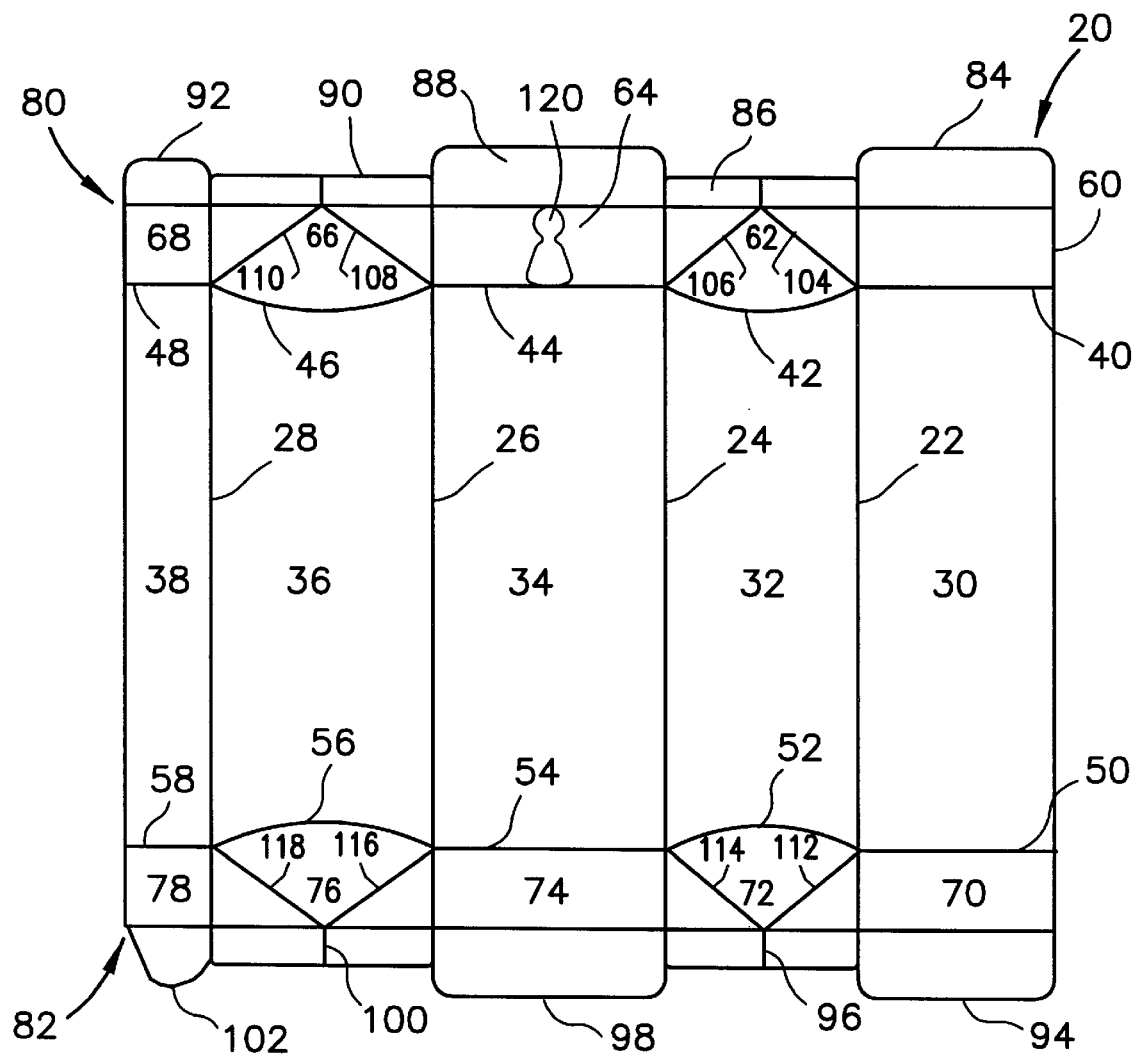

There is illustrated in FIG. 1 a plan view of a carton blank with one embodiment of the retainable access tab of the present invention. There is illustrated in FIG. 2 a plan view of a carton blank with an alternative embodiment of the retainable access tab of the present invention. As shown in FIG. 1, a carton blank is generally designated 20 and is composed of a plurality of panels which are defined by a plurality of score lines. A series of four longitudinal score lines 22, 24, 26 and 28 define a first side panel 30, a second side panel 32, a third side panel 34, a fourth side panel 36 and a fifth side panel 38. The fifth panel 38 is used to side seal the carton 20 and therefore has a much smaller width than the other side panels.

The plurality of side panels 30–38 are further divided into a plurality of roof panels and a plurality of bottom panels by a plurality of transverse score lines 40–58. A transverse score line 40 defines a roof panel 60. A curved transverse score line 42 defines a roof panel 62. A transverse score line 44 defines a roof panel 64. A curved transverse score line 46 defines a roof panel 66. A transverse score line 48 defines a seal roof panel 68. A transverse score line 50 defines a bottom panel 70. A curved transverse score line 52 defines a bottom panel 72. A transverse score line 54 defines a bottom panel 74. A curved transverse score line 56 defines a bottom panel 76. A transverse score line 58 defines a seal bottom panel 78. A second set of transverse score lines generally designated 80 and 82 define a plurality of flaps 84–102. A set of angled score lines 104 and 106 further divide the roof panel 62 and a set of angled score lines 108 and 110 further divide the roof panel 66 to permit proper folding of the roof panels 60–68 into the familiar gable top structure.

The curved transverse score lines 42, 46, 52 and 56 provide for a gable top carton having curved creases. Such a gable top carton and a carton blank are described in U.S. Pat. No. 5,474,232, entitled Gable Top Carton And Carton Blank With Curved Side Creases which is hereby incorporated in its entirety. However, curved transverse score lines 42, 46, 52 and 56 may be straight without departing from the scope of the present invention.

A retainable access tab is generally designated 120 and is incised into the carton 20 at the roof panel 64. The retainable access tab 120 has a keyhole configuration. However, those skilled in the pertinent art will recognize that other configurations are possible without departing from the scope of the present invention. The retainable access tab 120 substantially extends from the score line 80 at its top to beyond the transverse score line 44 at its bottom. However, as shown in FIG. 2, the retainable access tab 120 terminates prior to the transverse score line 44. A hinge 122 is located at the top of the retainable access tab 120 which provides for the retainability of the tab 120. The hinge 122 is created by discontinuing the incision of the configuration of the tab 120 along a section of the perimeter of the configuration. The hinge 122 allows for the retention of the tab 120 after the tab 120 has been peeled away to reveal an interior surface which is further described in reference to FIG. 3. Although the hinge 122 is located at the top of the retainable access tab 120, those skilled in the art will recognize that the hinge may be located at other sections of the retainable access tab 120 without departing from the scope of the present invention. The width of the retainable access tab 120 may be adjusted to accommodate the diameter of various straws.

As shown in FIG. 2, the retainable access tab 120 has a hour-glass configuration as opposed to the previous keyhole configuration illustrated in FIG. 1. The hour-glass configuration is substantially symmetrical about a central axis and thus easily allows for the hinge 122 to be located at either the top or the bottom of the retainable access tab 120. Unlike in FIG. 1, the retainable access tab 120 terminates prior to the transverse score line 44, and in FIG. 2, the retainable access tab 120 does not extend to the transverse score line 80.

There is illustrated in FIG. 3 a partial sectional view of the carton blank of the present invention. As shown in FIG. 3, the carton blank 20 is composed of at least three layers, an exterior layer 130, a core layer 132 and an interior layer 134. The interior and exterior layers 134 and 130 are the thermoplastic coating which is applied to the core layer 132 which is paperboard. The thermoplastic coating is usually a polyethylene compound which is capable of being heat sealed to complete the formation of a carton. The thermoplastic coating also acts as barrier to contaminants which might enter the carton.

As shown in FIG. 3, the retainable access tab 120 is peeled back for insertion of a straw through the remaining layers of the carton blank 20. The peeling back of the retainable access tab 120 actually divides the core layer 132 thereby leaving partial core layer 133 still intact on the carton. In one embodiment, the retainable access tab 120 is less than half of the thickness of the carton blank 20. In this manner, if for some reason the retainable access tab becomes accidentally detached, the integrity of the carton is maintained during the shipping of the carton from a production center to the ultimate consumer. Also, a more hygienic environment is maintained for the carton since only the exterior portion of the carton blank 20 need undergo die-cutting or the like to incise the retainable access tab 120 from the carton blank 20. The die-cutting of only the exterior portion of the carton blank 20 also ensures that the integrity of the carton is maintained since the interior portion of the carton blank 20 is untouched in forming the retainable access tab 120. The die-cutting of only the exterior portion of the carton blank 20 also facilitates the fabrication process for the carton blank 20. Additionally, the peeling of the retainable access tab 120 provides a more hygienic access to the contents by providing a penetration surface which has not been subjected to the environment until just prior to insertion of the straw.

There is illustrated in FIG. 4 a partial sectional view of the carton blank of the present invention with a straw inserted therethrough. As shown in FIG. 4, a straw 140 is inserted through the retainable access tab 120 to illustrate the present invention in operation. In a preferred embodiment of the present invention, the straw 140 may have a length substantially equal to the length of the side panel 34. The present invention allows for access to the entire contents of a carton while only using a straw 140 of minimal length thereby reducing the amount of material needed for the straw 140.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

We claim as our invention:

1. A carton blank for formation into a gable top carton, the carton blank having at least a core layer with interior and exterior thermoplastic coatings, the carton blank comprising:

first, second, third, fourth and fifth side panels, the side panels partitioned from each other by a plurality of vertical score lines;

first, second, third, fourth and fifth top panels, each of the top panels partitioned from a respective side panel by a transverse score line, the third top panel partitioned from the third side panel by a third panel transverse score line that is perpendicular to the plurality of vertical score lines, the second and fourth panels each having a plurality of angled score lines;

first, second, third, and fourth flaps, the flaps partitioned from the each of the respective top panels by a horizontal score line; and a retainable access tab disposed on the third top panel, the retainable access tab extending from just below the horizontal score line to at least the third panel transverse score line, the retainable access tab partially incised into at least the exterior thermoplastic coating of the carton blank and having a hinge for retention of the retainable access tab on the carton blank, the hinge defining an upper limit of the retainable access tab nearest the horizontal score line, the hinge substantially parallel to the horizontal score line, the retainable access tab incised to open outward from the carton blank about the hinge thereby exposing the core layer;

whereby the partial incision into the carton blank for the retainable access tab maintains the integrity of the carton blank and the eventual gable top carton formed therefrom.

2. The carton blank according to claim 1 wherein the retainable access tab is incised into a portion of the core layer.

3. The carton blank according to claim 1 wherein the retainable access tab is positioned in the center of the third top panel and defines an area less than a third of the area of the third top panel.

4. The carton blank according to claim 1 wherein the retainable access tab extends beyond the third panel transverse score line.

5. A gable top carton formed from the carton blank of claim 1.

6. The gable top carton according to claim 5 further comprising a straw for accessing a content of the gable top carton through puncturing of the core layer exposed by the retainable access tab, the straw having a length equal to a length of the third side panel.

7. The carton blank according to claim 1 wherein the retainable access tab has an hourglass configuration.

8. The carton blank according to claim 1 wherein the retainable tab has a keyhole configuration.

* * * * *